US010274241B2

(12) United States Patent
Ghiraldi

(10) Patent No.: US 10,274,241 B2
(45) Date of Patent: Apr. 30, 2019

(54) APPARATUS FOR PRESERVING AND TRANSPORTING FRESH OR FROZEN PRODUCTS, PARTICULARLY FOR THERMALLY INSULATED CONTAINERS OR THE LIKE

(71) Applicant: PRS—PASSIVE REFRIGERATION SOLUTIONS S.A., Lugano (CH)

(72) Inventor: Alberto Ghiraldi, Olgiate Molgora (IT)

(73) Assignee: PRS—PASSIVE REFRIGERATION SOLUTIONS S.A., Lugano (CH)

( * ) Notice: Subject to any disclaimer, the term of this patent is extended or adjusted under 35 U.S.C. 154(b) by 0 days.

(21) Appl. No.: 14/891,524

(22) PCT Filed: May 15, 2014

(86) PCT No.: PCT/IB2014/061459
§ 371 (c)(1),
(2) Date: Nov. 16, 2015

(87) PCT Pub. No.: WO2014/184763
PCT Pub. Date: Nov. 20, 2014

(65) Prior Publication Data
US 2016/0084563 A1 Mar. 24, 2016

(30) Foreign Application Priority Data
May 15, 2013 (IT) .............. MI2013A0796

(51) Int. Cl.
B65D 81/18 (2006.01)
F25D 3/14 (2006.01)
(Continued)

(52) U.S. Cl.
CPC ............. F25D 3/14 (2013.01); B65D 81/18 (2013.01); B65D 81/38 (2013.01); F25D 3/005 (2013.01);
(Continued)

(58) Field of Classification Search
CPC ...... F28D 7/06; F28D 20/0034; F28D 20/021; F28D 2021/0042; F28D 2020/0082; B65D 81/18; Y02E 60/142; Y02E 60/145
(Continued)

(56) References Cited

U.S. PATENT DOCUMENTS 5,172,567 A * 12/1992 Sadhir .................. B29C 70/882
165/10
5,235,819 A * 8/1993 Bruce ...................... F25D 3/06
62/438
(Continued)

FOREIGN PATENT DOCUMENTS

CN 2308857 Y 2/1999
DE 3445248 A1 7/1986
(Continued)

OTHER PUBLICATIONS

International Search Report and Written Opinion dated Sep. 4, 2014 re: Application No. PCT/IB2014/061459; pp. 1-10; citing: EP 1 236 960 A1, DE 34 45 248 A1, EP 1 632 739 A2, DE 10 2007 023645 A1 and U.S. Pat. No. 6,094,933 A.

Primary Examiner — David Teitelbaum
Assistant Examiner — Paul Schwarzenberg
(74) Attorney, Agent, or Firm — Cantor Colburn LLP

(57) ABSTRACT

An apparatus for preserving and transporting fresh or frozen products, particularly for thermally insulated containers, includes at least one heat accumulator associated with a respective inner wall of a container. The apparatus further includes a plurality of longitudinally extended heat accumulation modules, each one having an enclosure that delimits a cavity adapted to contain a heat accumulation liquid. The cavity accommodates a heat exchanger that can be supplied with a heat transfer fluid.
The heat accumulation modules are mutually connected mechanically and thermally, and in that the enclosure has a
(Continued)

first wall that faces the inner face of the container and has a substantially flat surface. The modules also include a second wall opposite the first wall and being directed towards the internal compartment of the container, having an at least partially ribbed surface.

16 Claims, 9 Drawing Sheets

(51) Int. Cl.
  *F25D 3/00* (2006.01)
  *F28D 7/06* (2006.01)
  *F28D 20/00* (2006.01)
  *F28D 20/02* (2006.01)
  *B65D 81/38* (2006.01)
  *F28D 21/00* (2006.01)

(52) U.S. Cl.
  CPC ............ *F28D 7/06* (2013.01); *F28D 20/0034* (2013.01); *F28D 20/021* (2013.01); *F28D 2020/0082* (2013.01); *F28D 2021/0042* (2013.01); *Y02E 60/142* (2013.01); *Y02E 60/145* (2013.01)

(58) Field of Classification Search
  USPC ........................................................ 62/457.2
  See application file for complete search history.

(56) References Cited

U.S. PATENT DOCUMENTS

| | | | | |
|---|---|---|---|---|
| 5,272,887 | A * | 12/1993 | Zendzian, Sr. | ......... F25D 3/005 62/240 |
| 5,548,967 | A * | 8/1996 | Ghiraldi | ................. F25D 17/02 62/434 |
| 6,094,933 | A | 8/2000 | Forsthuber et al. | |
| 7,412,846 | B2 | 8/2008 | Sekiya et al. | |
| 2006/0174648 | A1 * | 8/2006 | Lantz | ................. B65D 81/3816 62/371 |
| 2010/0170286 | A1 * | 7/2010 | Ghiraldi | ................ F25D 11/006 62/434 |
| 2011/0286724 | A1 * | 11/2011 | Goodman | ............... F28D 19/04 392/346 |
| 2013/0048647 | A1 * | 2/2013 | Farrar | .................. B65D 88/745 220/592.01 |

FOREIGN PATENT DOCUMENTS

| | | | | |
|---|---|---|---|---|
| DE | 102007023645 A1 | 12/2008 | | |
| EP | 1236960 A1 * | 9/2002 | ........... | B60H 1/3232 |
| EP | 1632739 A2 | 3/2006 | | |
| WO | WO 2012129463 A2 * | 9/2012 | ............... | F25D 3/08 |

* cited by examiner

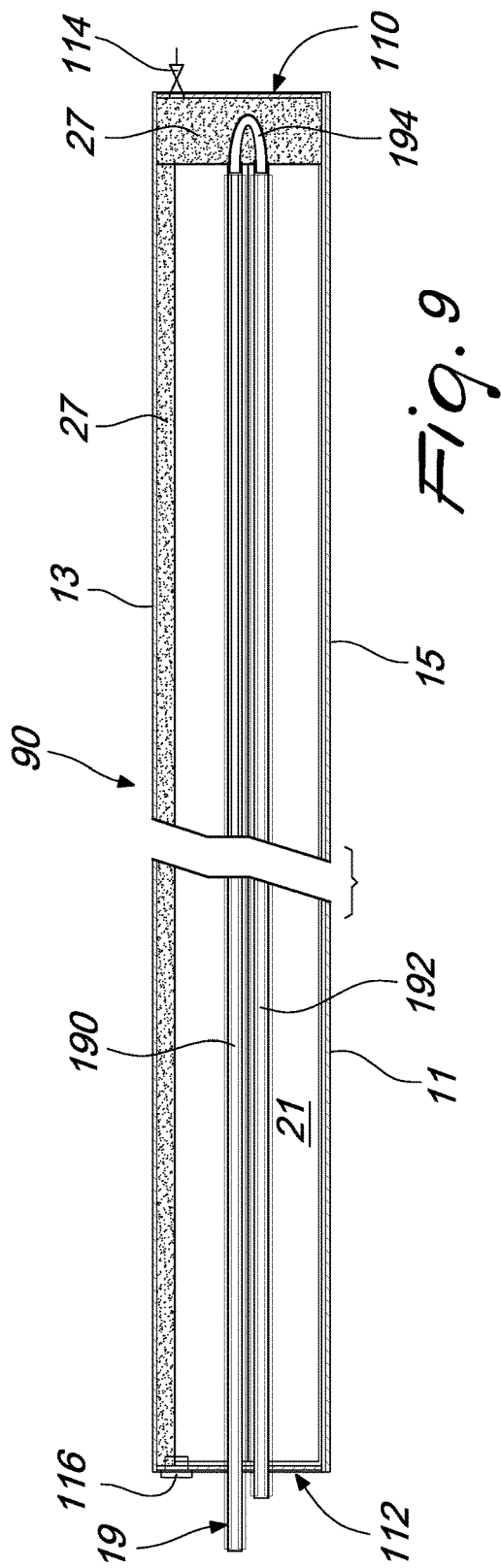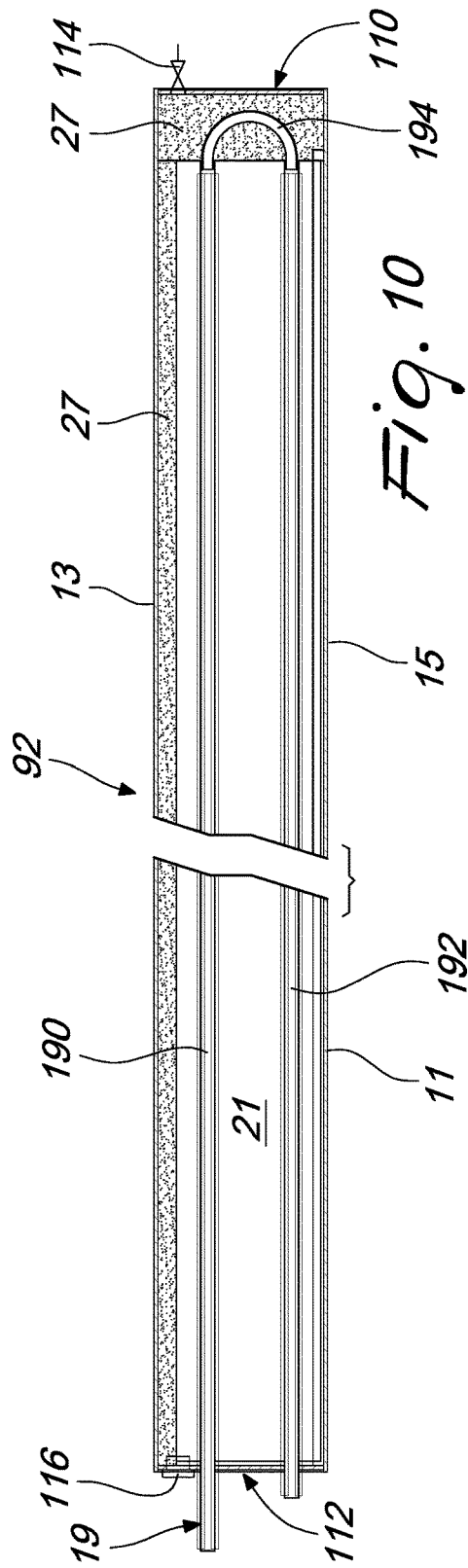

APPARATUS FOR PRESERVING AND TRANSPORTING FRESH OR FROZEN PRODUCTS, PARTICULARLY FOR THERMALLY INSULATED CONTAINERS OR THE LIKE

TECHNICAL FIELD

The present disclosure relates to an apparatus for preserving and transporting fresh or frozen products, particularly for thermally insulated containers or the like.

BACKGROUND

The transport in containers of perishable goods, in particular of foods, requires the maintenance of temperatures in accordance with the ATP rules and in particular with Class A, for products designated "fresh", with temperatures that, in relation to the type and mode of transport or distribution, are comprised between 0° C. and +4° C. or between 0° C. and +7° C., and with Class C, with temperatures below −18° C., for products designated "frozen". Containers of perishable goods are typically means that require high standards of preservation of the goods they contain, ensuring autonomous thermal preservation without intermediate recharging for periods as long as 30 days.

In particular, containers can be divided into two main categories, on the basis of the inner length/inner height ratio of the container, and a distinction is made between containers in which such ratio is greater than 1.5 or smaller than 1.5.

Containers with an inner length/inner height ratio greater than 1.5 can be used for preservation and transport of perishable goods:
- up to 5-7 days mainly for short sea, intermodal, and off-shore transport (hereinafter "short sea");
- up to 12-15 days for multimodal transport, river navigation, and small and medium coastal navigation (hereinafter "mid sea");
- up to 30 days for deep sea transport (hereinafter "deep sea").

Containers with an inner length/inner height ratio of up to 1.5 are instead used for the preservation and transport of perishable goods over short and medium distances, and particularly for off-shore, on-shore, intermodal and road transport, as well as in "short sea" shipping.

In conventional containers for perishable goods, maintenance of a controlled temperature regime is achieved either by way of the application of heat accumulation systems, or by way of the use of electromechanical refrigeration systems which are powered electrically or by Diesel generators.

Both of the aforementioned technologies are not devoid of drawbacks, however.

Conventional heat accumulation systems have several unresolved technical problems, which are described below.

a) Heat accumulation systems comprise box-like modules containing a heat accumulation liquid that is subject to volumetric dilation owing to the phase transition of the liquid. In the box-like modules there are volumes that are not filled with liquid, which contain a vacuum and are used as an expansion chamber. If the container is not perfectly leveled, then the outflow at one end of the heat accumulation liquid will result in the total filling of a part of the module where dilation with no possibility of expansion during freezing of the liquid will cause destructive levels of pressure. Furthermore the presence at one end of tubular connections with limited exchange surface leads to the formation of significant pockets of liquid which subsequently freeze with further localized formation of destructive levels of pressure and the breakage within a short time of the box-like modules.

b) The limited heat exchange capacities of conventional heat accumulation systems involve the necessity of covering, in order to obtain the necessary exchange surfaces, most of the walls with the above mentioned box-like modules, with consequent increase in the costs and tare weight of the container. Covering the floor is of particularly critical importance, since it is subject to major stresses. Furthermore the limited heat exchange capacities must be compensated with higher-powered systems, with consequent increase in losses of charge and thus in energy consumption.

c) The arrangement of the box-like modules of conventional heat accumulation systems is thermally discontinuous, in particular in the upper corners of the container which are exposed to solar radiation and where the principal thermal bridges are located. This results in significant thermal flows with consequent thermal loads that have to be absorbed by the internal part of the heat accumulation system.

d) The thermal load inside the container is not uniform but is concentrated on the roof by way of the solar radiation, the thermal flows deriving from the lack of thermal continuity, and the metabolic heat of the fruit and vegetable products preserved inside the container. Such non-uniformity results in a reduction in autonomy, an increase in the tare weight and in transport costs.

e) The box-like modules in conventional heat accumulation systems are hung from the ceiling of the container by way of polyurethane panels, which, under the effect of the weight of the heat accumulation modules, the vibrations, and the episodes of acceleration experienced during the transport and handling of the container, tend to become detached, rendering the container unusable.

f) The box-like modules, made of aluminum, do not allow the use of saline solutions for the heat accumulation liquid, since they are not compatible with aluminum and in any case they are unstable over time.

g) It is currently not possible to use conventional accumulation systems in containers for perishable products belonging to Class C, but these are used for Class A product only, where the thermal loads are significantly lower.

h) An intrinsic characteristic of all means of transport, in particular for medium and long trips where many pallets are loaded by way of mechanical means, is the difficulty of sanitization and the introduction of significant bacterial loads during loading, with consequent exponential growth thereof, as well as the formation of Botrytis and other mildews, as well as the difficulty of generating and maintaining a modified atmosphere that minimizes the metabolism of the products after loading in the container.

Conventional technology based on refrigeration apparatuses depends on a continuous electric or Diesel-electric power supply with mains power in ports, on board ship, and aggregated Diesel generators on lorries for road stages, and it has the drawbacks described below.

a) The refrigeration assembly is generally installed at one end of the container which can be over 13 m in length with an internal cross-section of 4.8 m², completely filled with products, where the available cross-sections for the circulation of air for the delivery are very small and require high air circulation speeds, greater than 12 msec. The interaction between the high air circulation speed and the small cross-sections available have the following drawbacks:
- high losses of charge with associated high absorptions of energy;

an increase in the coefficient of deterioration of the preserved products, and an increase in desiccation, even with high relative humidity and optimal temperature;

the formation of ice and the necessity of frequent defrosting;

the high speed of the air in contact with the walls, ceiling and upper corners brings an increase in the thermal flow between the environment and the container interior, in particular at the thermal bridges, doors etc.;

b) The refrigeration assemblies require a significant maintenance cost, not least because maintenance operations can be carried out only by specialist technicians in special-purpose service centers.

c) The refrigeration assemblies are not adapted for use on rail transport, on ships without mains sockets, in particular for river navigation and small and medium coastal navigation, on lorries without Diesel generators, for post-harvest refrigeration, and in all cases where energy is not continuously available.

d) The refrigeration apparatuses do not make it possible to conform to the requirements for the optimal preservation of fresh products, i.e. absence of ventilation, humidity over 95% and temperature constantly at optimal values.

e) The refrigeration capacity is limited to the maintenance of products only, and does not make it possible to carry out the post-harvest refrigeration of products.

f) The use of conventional refrigeration systems is not permitted for the provisioning of off-shore oil platforms and for transit in very long tunnels, where the use is required of intrinsically safe electrical systems and therefore it is necessary to use complex procedures that require shutdown on approach, adjacent to platforms and in tunnels, with consequent interruption of refrigeration and increase in running costs.

SUMMARY

The disclosure provides an apparatus for preserving and transporting fresh or frozen products, particularly for thermally insulated containers or the like, that solves the above technical problem, eliminates the drawbacks and overcomes the limitations of the known art.

Within this aim, the present disclosure provides an apparatus for preserving and transporting fresh or frozen products which is capable of maintaining the temperature for the period of thermal autonomy without using energy after the thermal charging and thus the possibility of traveling without an electric connection or power supply of any type.

The disclosure also provides an apparatus for maintaining the overall energy consumption considerably lower than in the solutions of the known art.

The disclosure further provides an apparatus for ensuring the maintenance of the optimal conditions for the preservation of fresh food products, including:

constant temperature with average hourly fluctuation of less than 0.1° C.;
relative humidity greater than 95%;
absence of ventilation.

As such, the disclosure provides an apparatus for preserving and transporting fresh or frozen products, particularly for thermally insulated containers or the like, comprising at least one heat accumulator associated with a respective inner wall of a container, and comprising a plurality of longitudinally extended heat accumulation modules, each one of said modules comprising an enclosure that delimits a cavity adapted to contain a heat accumulation liquid, said cavity accommodating a heat exchanger that can be supplied with a heat transfer fluid.

BRIEF DESCRIPTION OF THE DRAWINGS

Further characteristics and advantages of the disclosure will become better apparent from the detailed description of a preferred, but not exclusive, embodiment of an apparatus for preserving and transporting fresh or frozen products, particularly for thermally insulated containers or the like, which is illustrated by way of non-limiting example with the aid of the accompanying drawings wherein:

FIG. 9 is a sectional view of a first type of heat accumulation module of the apparatus in FIG. 1;

FIG. 10 is a sectional view of a second type of heat accumulation module of the apparatus in FIG. 1.

DETAILED DESCRIPTION OF THE DRAWINGS

Figure 1:
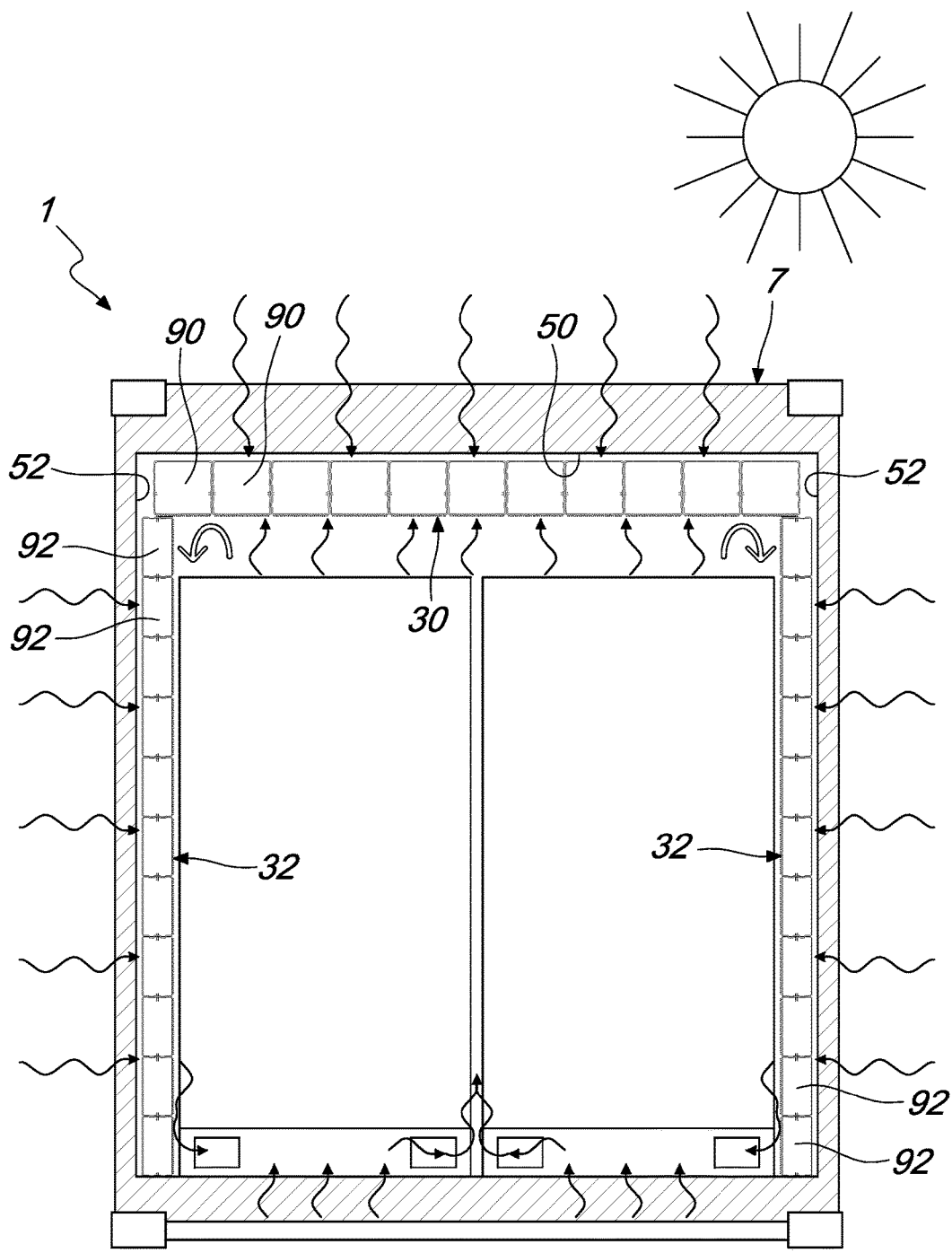
FIG. 1 is a schematic front elevation view of an embodiment of an apparatus for preserving and transporting fresh or frozen products, according to the disclosure, installed in a container, in which the thermal flows are shown.

With reference to the figures, the apparatus for preserving and transporting fresh or frozen products, particularly for thermally insulated containers or the like, generally designated by the reference numeral 1, comprises at least one heat accumulator 30, 32, 34, 36 which is associated with a respective inner wall 50, 52, 54 of a container 7. Each heat accumulator 30, 32, 34, 36 comprises a plurality of longitudinally extended heat accumulation modules 90, 92, 94, each one of which comprises an enclosure 11 that delimits a cavity 21 that is adapted to contain a heat accumulation liquid. The cavity 21 accommodates a heat exchanger 19 that can be supplied with a heat transfer fluid.

According to the disclosure, the heat accumulation modules 90, 92, 94 are mutually connected mechanically and thermally. The enclosure 11 furthermore has a first wall 13 that faces the inner face 50, 52, 54 of the container 7 and has a substantially flat surface and a second wall 15 that is opposite with respect to the first wall 13, is directed toward the internal compartment 17 of the container 7, and has an at least partially ribbed surface.

Advantageously, as illustrated in particular in FIGS. 9 and 10, the heat exchanger 19 comprises two ducts 190, 192 that are ribbed internally and externally, are extended longitudinally within the enclosure 11 and are connected, proximate to the back end 110 of the enclosure 11, by a curved connector 194. The head end 112 of the enclosure 11 advantageously comprises hydraulic connectors to the aforementioned two ducts 190, 192.

Furthermore, the enclosure 11 can comprise, on the back end 110, a hole with venting valve 114 for the release of the oxygen that is released by the heat accumulation liquid. On the head end 112, there can be a hole with a screw stopper 116 for filling with the heat accumulation liquid.

Each heat accumulator 30, 32, 34, 36 advantageously covers substantially the entire surface of the inner wall 50, 52, 54 of the container 7, with which it is associated, thus creating a distributed thermal filter on the inner wall 50, 52, 54. This makes it possible to limit the heat to be absorbed internally to only the heat dissipated by the products and by the flow originating from the surfaces where the aforementioned thermal filter is not applied.

Figure 2:
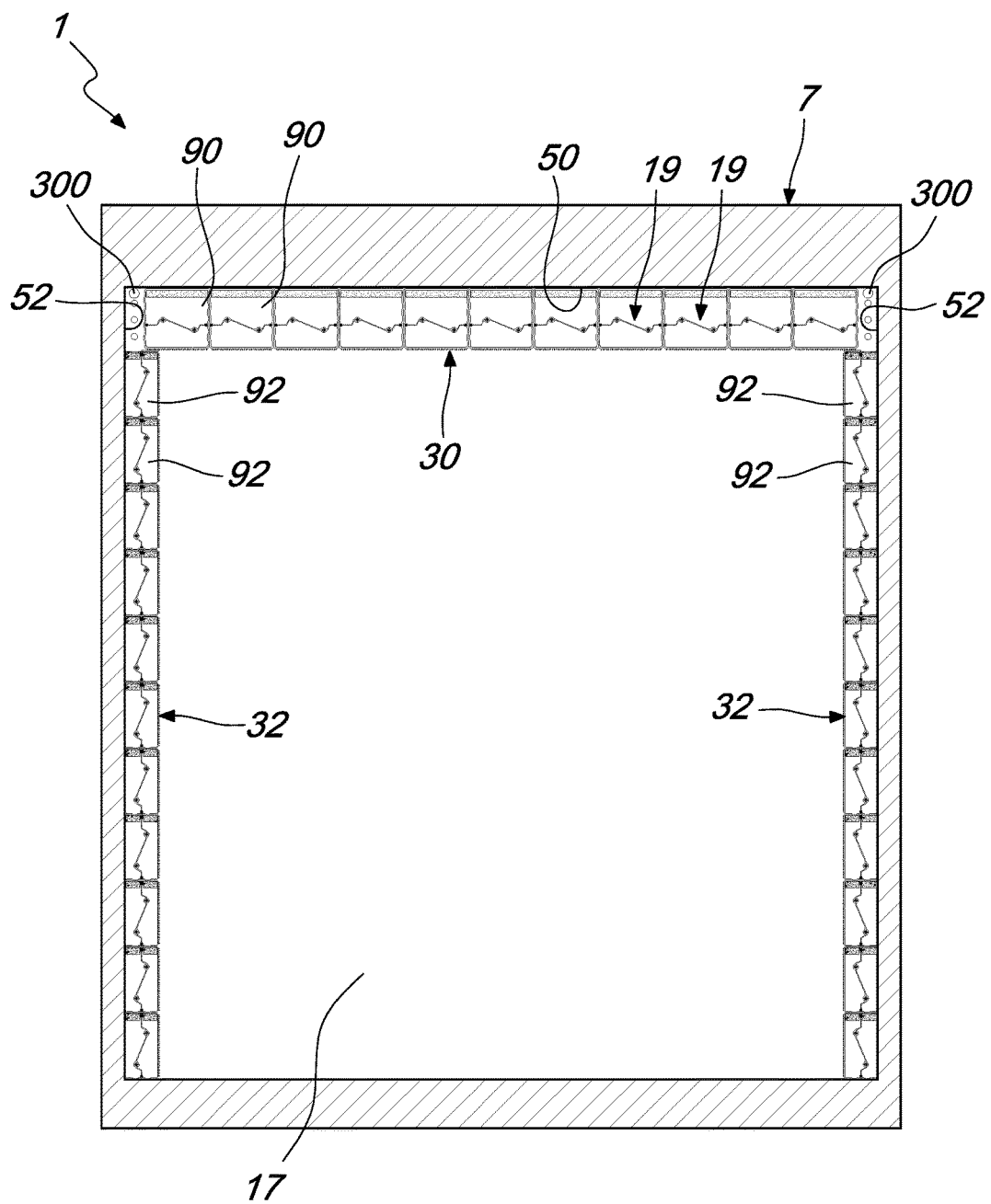
FIG. 2 is a sectional front view of the apparatus in FIG. 1, taken across the central portion of the container.
Figure 3:
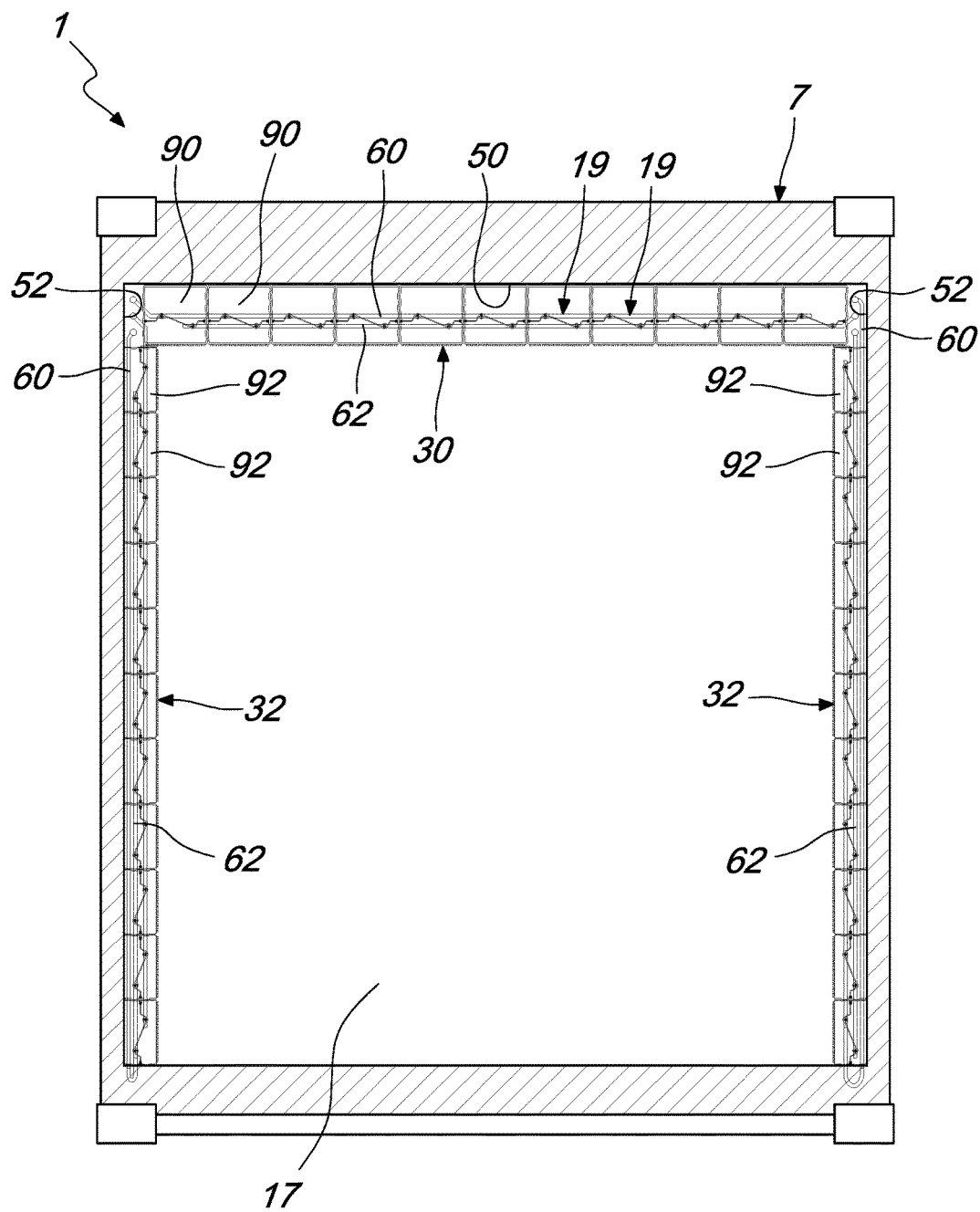
FIG. 3 is a sectional front view of the apparatus in FIG. 1, taken across the end portion of the container.

In particular, as shown in FIGS. 1 to 3, the apparatus 1 comprises a heat accumulator 30 that is associated with the ceiling 50 of the internal compartment 17 of the container 7, and two heat accumulators 32 which are associated respectively with the side walls 52 of the internal compartment 17.

The ceiling-mounted heat accumulator 30 rests on the two wall-mounted heat accumulators 32 and is connected mechanically and thermally to each one of the two wall-mounted heat accumulators 32 by way of the interposition of plates 25 that are welded to the ceiling-mounted heat accumulator 30 and respectively to each one of the two wall-mounted heat accumulators 32. The apparatus 1 thus constitutes a monolithic structure that cooperates structurally with the structure of the container 7, in conformance with the applicable regulations on maritime, rail and road transport conditions, as well as on movement in port and rail terminals. Furthermore the thermal connection between the ceiling-mounted heat accumulator 30 and the wall-mounted heat accumulators 32, by way of welding the plates 25, creates a continuous thermal filter that is distributed on the ceiling 50 and side walls 52 and which absorbs the heat entering from the walls and from the roof of the container 7, but also from the corner edges, which constitute a major source of thermal flow.

Furthermore, as illustrated in the apparatus 1 shown in FIGS. 1 to 3, each heat accumulator 30, 32 is associated with the respective inner wall 50, 52 so that the longitudinal direction of extension of the heat accumulation modules 90, 92 of each heat accumulator 30, 32 is horizontal.

The apparatus 1 shown in FIGS. 1 to 3 is particularly adapted to be installed in containers 7 of the mid sea and deep sea type.

The heat accumulation modules 90, 92 are furthermore advantageously sealed off from each other so that damage to one module leads to the leaking of the heat accumulation liquid from that module only.

Figure 4:
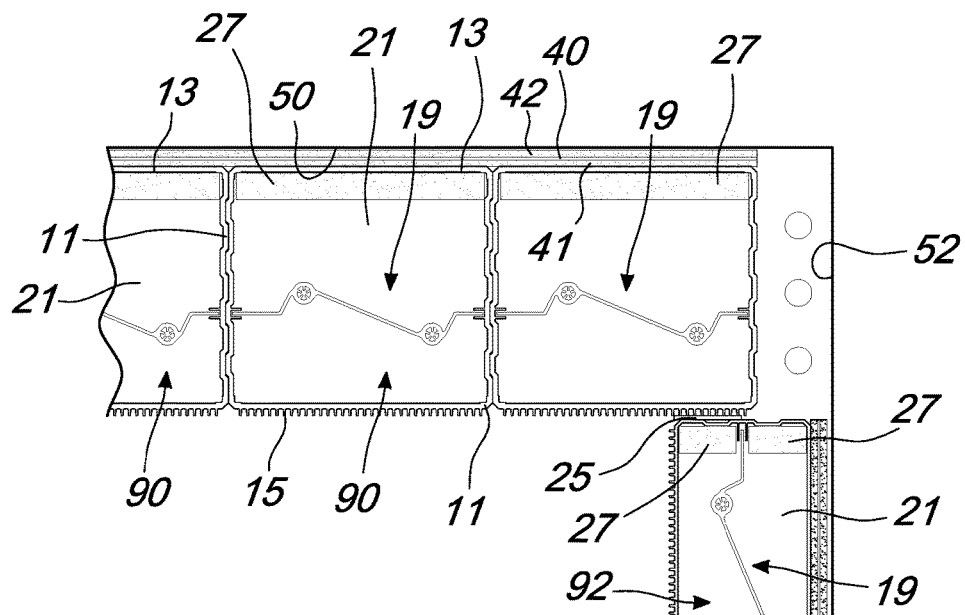
FIG. 4 is an enlargement of a portion of the apparatus in FIG. 1, taken at an upper corner of the container.

Advantageously the modules 90, 92 are welded together so as to constitute a monolithic structure that is structurally strong and capable of supporting its own weight and the episodes of acceleration owing to transport and movement. The modules 90, 92 are also welded together so as to constitute a thermally monolithic structure where the temperatures of the individual modules are mutually uniform. In particular, as illustrated in FIG. 4, the enclosure 11 of each module 90, 92 has side walls 120 that are contoured so that each enclosure 11 mechanically interlocks with the adjacent modules.

Figure 6:
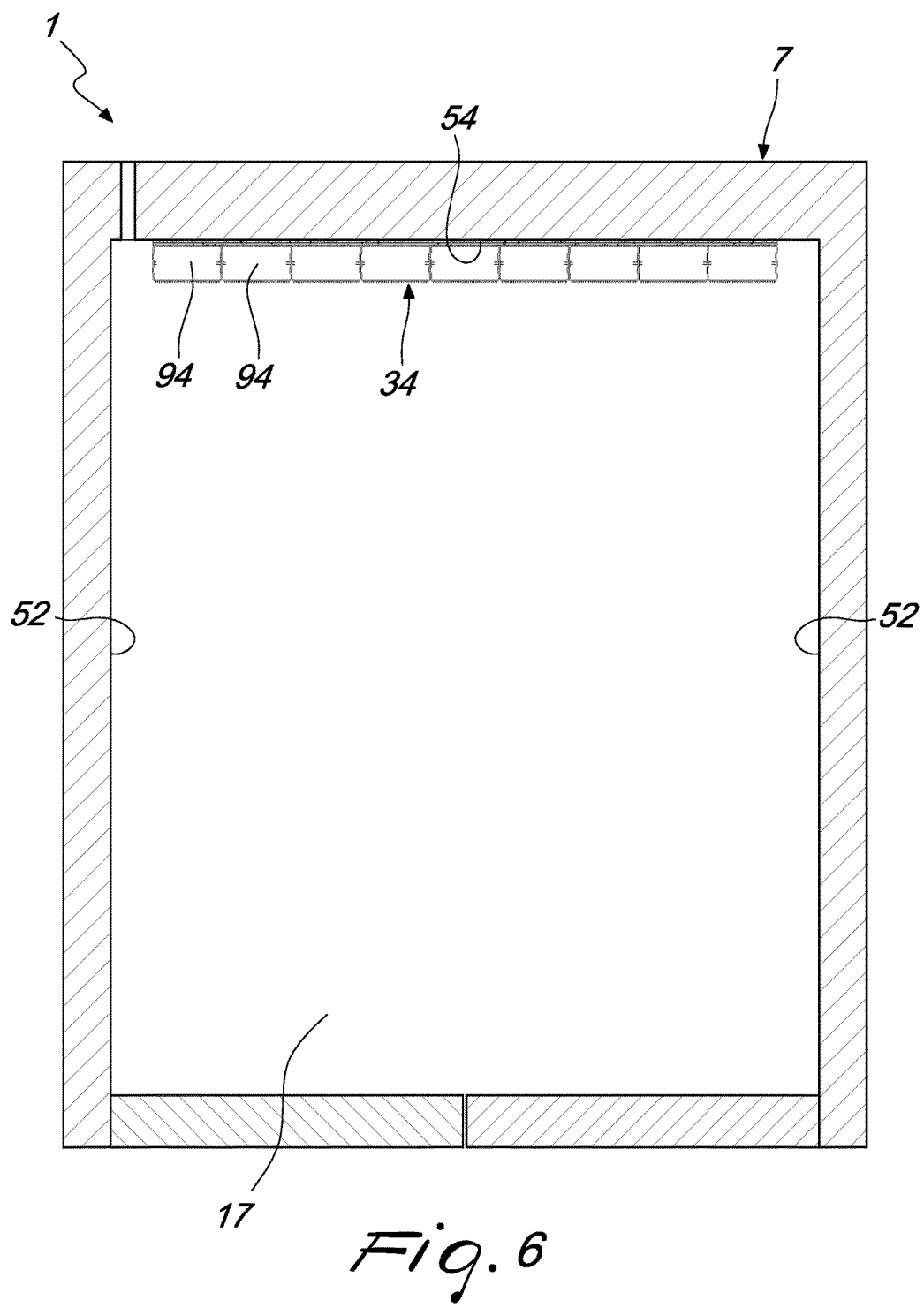
FIG. 6 is a plan view of a first variation of the apparatus in FIG. 1, installed in a container.
Figure 7:
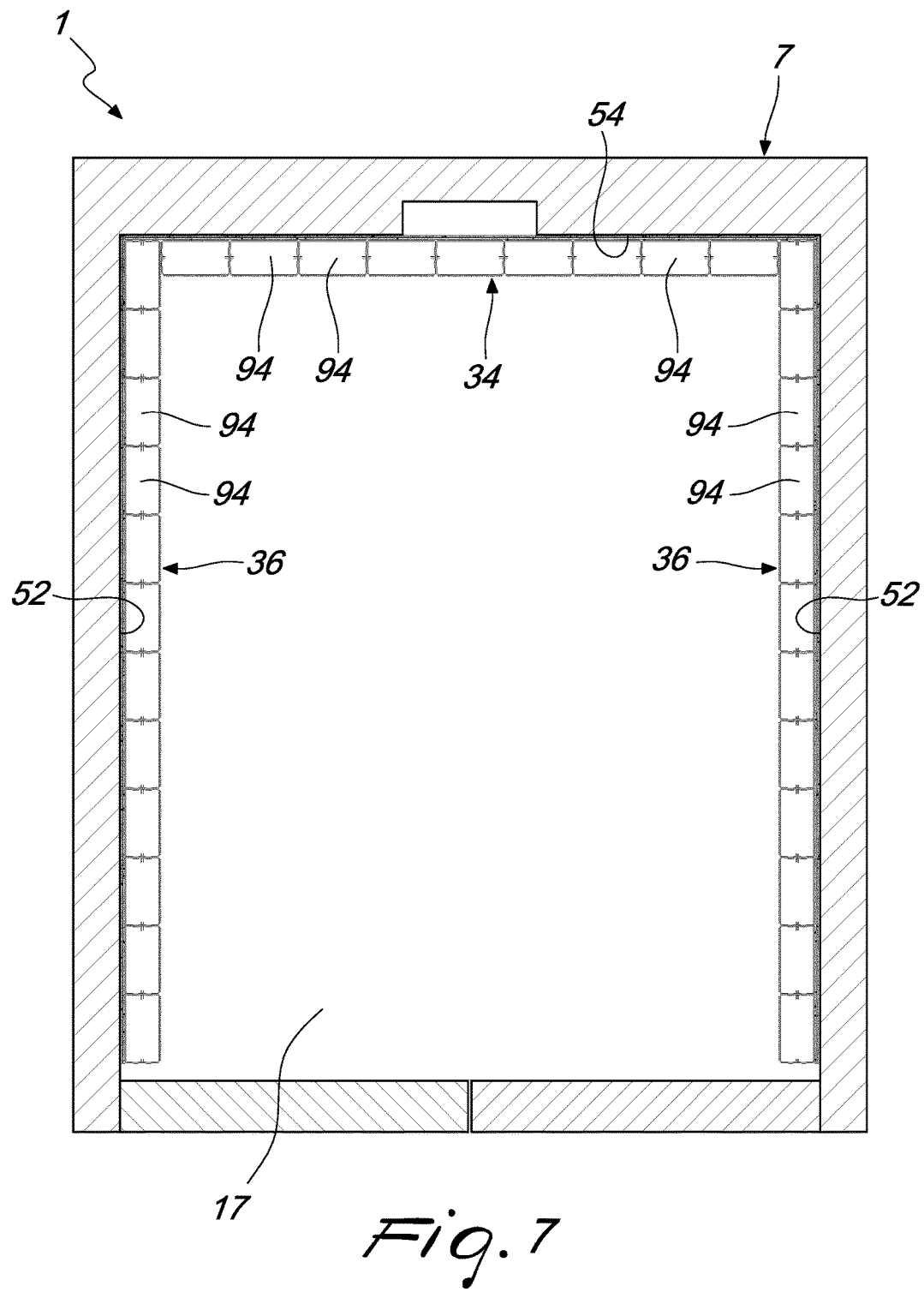
FIG. 7 is a plan view of a second variation of the apparatus in FIG. 1, installed in a container.
Figure 8:
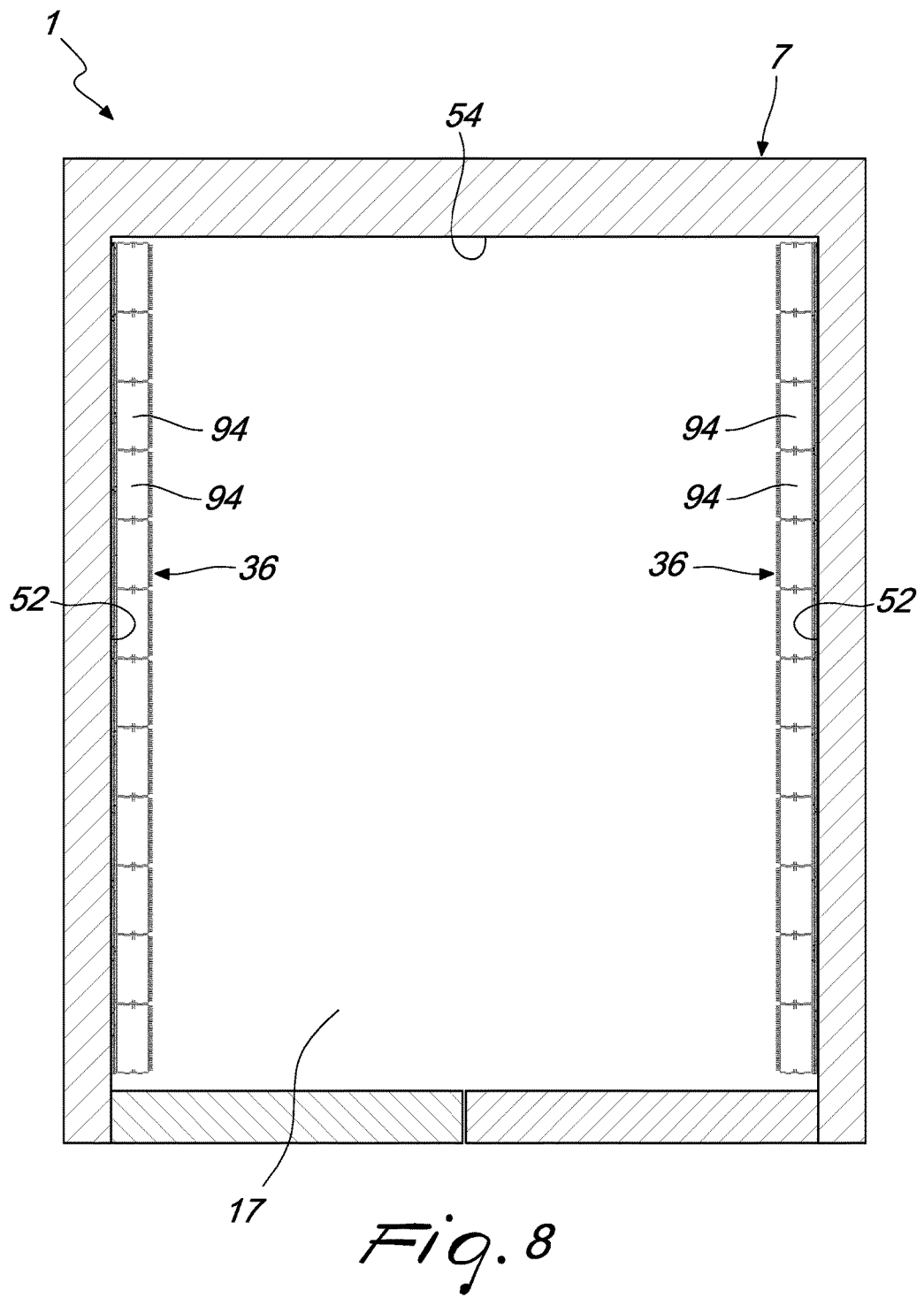
FIG. 8 is a plan view of a third variation of the apparatus in FIG. 1, installed in a container.

In the variations of the apparatus 1 illustrated in FIGS. 6, 7 and 8, the heat accumulators 34, 36 are associated with the respective inner wall 50, 52 so that the longitudinal direction of extension of the heat accumulation modules 94 is substantially vertical. Such variations are particularly adapted for containers 7 that are used in offshore, onshore, intermodal and road transport, as well as in short sea shipping.

In particular in the variation of the apparatus 1 shown in FIG. 6, there is a single heat accumulator 34 associated with the back wall 54 of the container 7. In the variation of the apparatus 1 shown in FIG. 7, there is a heat accumulator 34 that is associated with the back wall 54 and there are two heat accumulators 36 that are associated with the side walls 52. In the variation of the apparatus 1 shown in FIG. 8, there are only two heat accumulators 36 which are associated with the side walls 5. In such variations there is no ceiling-mounted heat accumulator.

Advantageously, the apparatus 1 can also comprise the presence of only one heat accumulator 30 which is associated with the ceiling 50 of the container 7.

Advantageously, as illustrated in particular in FIGS. 9 and 10, the enclosure 11 contains a filling material 27 that is adapted to absorb the dilation of the heat accumulation liquid in the phase transition from liquid to solid.

Advantageously the curved connector 194 is embedded in such filling material 27.

Such filling material 27 is preferably of the type of closed-cell expanded polyethylene, and has an overall volume of approximately 10% of the volume of the heat accumulation liquid that the dilation has to absorb. In particular in the modules 90, 92 that are arranged horizontally, the filling material 27 is distributed at the upper wall 13 of each enclosure 11 and at the back end 110 opposite the head end 112 where the injection of the heat transfer fluid is performed, where the thickness must be equal to the outer radius, increased by 10%, of the curve that defines the curved connector 194, for connection between the two ducts 190, 192 of the thermal exchanger 19. The presence of the aforementioned filling material 27 prevents the formation at the back end 110 of inclusions of heat accumulation liquid in the liquid phase, the subsequent freezing of which, delayed by the limited exchange surface of the curve proper and by the heating caused by the contact with the internal environment of the container 7, causes destructive levels of pressure owing to the sealing effect of the other, completely frozen liquid which does not allow escape routes to the liquid contained in the back end 110.

The heat accumulation liquid has advantageously a volume of substantially 100% of the free volume inside the enclosure 11, net of the filling material 27. This makes it possible to ensure that during the thermal charging the increase in volume of the heat accumulation liquid caused by the phase transition is uniformly distributed along all the heat accumulation module 90, 92, 94 and that thus the heat accumulation liquid cannot move predominantly to one end or the other therefore preventing expansion during freezing, with consequent destructive levels of pressure.

In the heat accumulators 34, 36 the modules 94 of which are arranged vertically, where the presence of the filling material 27 is not envisaged, the heat accumulation liquid advantageously occupies a volume of 85-92% of the free internal volume of the enclosure 11.

Figure 5:
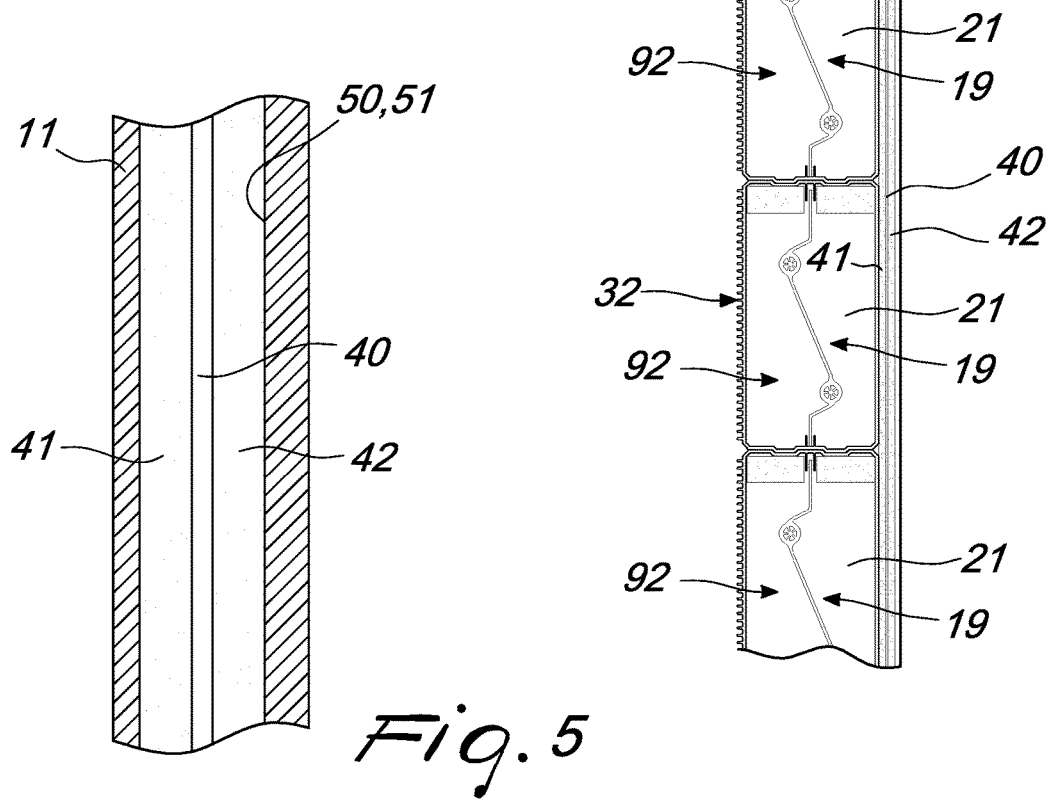
FIG. 5 is an enlargement of a portion of the apparatus in FIG. 4.

Furthermore, a layer of reflective material 40 can be interposed between the first wall 13 directed toward the inner face 50, 52, 54 of the container 7 and the inner face 50, 52, 54 proper. Such layer of reflective material 40 can be of the Kapton type or equivalent. In fact a flat and reflective surface minimizes the absorption of heat from the outside. Preferably, as shown in FIGS. 4 and 5, a first layer of thermally insulating material 41, the layer of reflective material 40, and a second layer of thermally insulating material 42 are interposed respectively between the first wall 13 directed toward the inner face 50, 52, 54 of the container 7 and the inner face 50, 52, 54 proper. The layer of thermally insulating material 41, 42 can be made of material of the elastic expanded type.

Each of the modules 90, 92, 94 of a heat accumulator 30, 32, 34, 36 is advantageously connected in parallel to the other modules 90, 92, 94 of that same heat accumulator 30, 32, 34, 36 by way of a delivery manifold 60 that is sized internally so as to pre-equalize the flow-rate of the heat transfer fluid in each one of the heat exchangers 19, and by way of a return manifold 62 that is sized internally so as to post-equalize the flow-rate of the heat transfer fluid in each one of the heat exchangers 19.

The delivery manifold 60 and the return manifold 62 are advantageously divided into three sub-modules where the available cross-section for the passage of the heat transfer fluid is such that the feeding of all the heat exchangers 19 is done with uniform pressure. In particular the three sub-modules of the delivery manifold 60 can have an available cross-section that is progressively decreasing, contrary to the three sub-modules of the return manifold 62, the available cross-section of which can be progressively increasing. In order to prevent preferential flow to the last module, at the ends of the delivery manifold 60 it is possible to have a dead stub pipe of length greater than or equal to the center distance between the thermal exchangers 19.

The input and output direction of the heat transfer fluid respectively from the delivery manifold 60 and from the return manifold 62 is crossed, in order to obtain uniform losses of charge.

The purpose of having a crossed flow exchange between the heat transfer fluid (gas) in the liquid phase flowing in and the heat transfer fluid (gas) in the gaseous phase flowing out is to:
 supercool the gas in the liquid phase, which will be injected into the "heat exchangers";
 cause the complete evaporation of the gas flowing out, thus preventing the return of liquid to the compressor, and consequent serious damage thereto;
 increase the efficiency of the compressor, thanks to the rise in temperature of the return gas;
 make it possible to reduce the heat insulation of the pipe carrying the gas flowing out, to the advantage of lower rigidity, smaller size and lighter weights thereof;
 prevent the formation of ice on the quick-fit couplings, thus preventing problems when disconnecting;
 prevent thermal dispersions owing to the return of cold gas.

Advantageously there can also be at least one duct 300, shown for simplicity in FIG. 2 only, for sanitization, which extends inside the container 7.

Each heat accumulator 30, 32, 34, 36 can comprise a valve for modulating the flow of the heat transfer fluid, in order to maintain similar temperatures in the several different heat accumulators 30, 32, 34, 36 that are comprised in a single apparatus 1, with respect to, for example, for the different heat accumulation capacity between ceiling-mounted heat accumulators 30 or wall-mounted heat accumulators 32, as explained below.

Each heat accumulator 30, 32, 34, 36 can comprise quick-coupling connectors for connection to thermal charging devices.

In particular, in the apparatus 1, there can be a quick-fit input coupling for the delivery of the heat transfer fluid which is distributed to the several heat accumulators 30, 32, 34, 36 by way of a diffuser arranged on the back wall, the three exit cross-sections of which are provided with on-off solenoid valves and are dimensioned and arranged so as to pre-equalize the circuits as a function of the amount of heat to be absorbed in order to obtain the complete and simultaneous freezing of the heat accumulation liquid in the several different heat accumulators 30, 32, 34, 36 notwithstanding any difference in accumulation capacity. Furthermore, there can be a quick-fit coupling connected to a manifold that is arranged on the back wall for the outflow from the several heat accumulators 30, 32, 34, 36 the cross-sections of which are dimensioned and arranged so as to post-equalize the circuits as a function of the amount of heat to be absorbed in order to obtain the complete and simultaneous freezing of the heat accumulation liquid.

Finally, there can also be a highly-insulated panel arranged on the back wall, for the mechanical protection of the system for the distribution and return of the heat transfer fluid and for the thermal protection of the charge, in order to prevent the low temperatures of the ducts during charging from damaging the products, if fresh products are being stored.

The heat exchange surface/bulk surface ratio of the at least partially ribbed surface of the second wall 15 of each heat accumulator 30, 32, 34, 36 can be comprised between 3:1 and 6:1 depending on the thermal load required, i.e. on the size of the container 7 and on the conditions of transport.

In particular, thermal equalizing is essential and its purpose is to:
 a) ensure the thermal charging in parallel with uniform temperatures, notwithstanding the different quantities of heat to be absorbed, so as to maintain constant temperatures in the several different heat accumulators 30, 32, 34, 36 that constitute an apparatus 1, so as to not to have localized supercooling which would damage the fresh product;
 b) ensure the same thermal autonomy for components that are exposed to thermal loads that differ greatly owing to the position of the heat accumulators 30, 32, 34, 36 where the thermal load of the ceiling-mounted heat accumulator 30 is due to the solar radiation on the roof and on the side corner edges of the container 7 and also due to the direct absorption of the heat originating from the food products.

With regard to the foregoing, in the mid sea and deep sea versions of the container 7, the apparatus 1 can comprise:
 a ceiling-mounted heat accumulator 30, whose heat accumulation modules 90 have an effective width of approximately 170 mm, and whose exchange surface is constituted by ribs with heights of approximately 10 mm and a pitch of approximately 5 mm, with a heat exchange surface/bulk surface ratio of approximately 5:1;
 two wall-mounted heat accumulators 32, whose modules 92 have an effective width of approximately 96 mm, and whose exchange surface is constituted by ribs with heights of approximately 5 mm and a pitch of approximately 5 mm, with a heat exchange surface/bulk surface ratio of approximately 3:1.

In the short sea version of the container 7, the apparatus 1 can comprise only two wall-mounted heat accumulators 32, whose accumulation modules have an effective width of approximately 89 mm, and whose exchange surface is constituted by ribs with height of approximately 12 mm and a pitch of approximately 5 mm, with a heat exchange surface/bulk surface ratio of approximately 6:1.

Advantageously, the ceiling-mounted heat accumulator 30 and the wall-mounted heat accumulator 32 can comprise a number of modules 90, 92 that can vary from 10 to 12.

Depending on the class, A or C, to which the container 7 belongs, the heat accumulation liquid can be selected from the following group:

hydrogen peroxide at concentrations comprised between 1.5% and 5%;
hydrogen peroxide at concentrations comprised between 25% and 35%;
n-decane.

In particular, in apparatuses 1 installed in Class A containers 7 it is preferable to use hydrogen peroxide in concentrations comprised between 1.5% and 3% for the ceiling-mounted heat accumulators 30 and in concentrations between 2% and 4% for the wall-mounted accumulators 32. Varying the percentage of oxygen in the hydrogen peroxide makes it possible to vary the solid/liquid phase transition temperature thereof.

For Class C containers 7 it is preferable to use hydrogen peroxide at concentrations comprised between 25% and 35%, which has a phase transition temperature comprised in the range between −25° C. and −32° C., or to use n-decane, which has a phase transition temperature substantially equal to −29.5° C.

The apparatus 1 can further comprise a system for compensating for outside temperatures that are not compatible with fresh products.

If the temperature outside is lower than the temperature specified by the regulations applicable to fresh products and in particular Class A of the ATP Agreement, then the thermal charger can also be used to heat the heat accumulation liquid to temperatures of up to 5° C., which will, using the sensible heat accumulated, maintain the desired temperature inside the container 7.

The apparatus 1 can further comprise an internal sanitization system.

The loading of pallets may be done under any conditions, including in rural areas etc.; furthermore, loading is done by way of mechanical means that introduce significant bacterial loads which, in the presence of high humidity, can result in further developments. The internal sanitization system comprises a system for producing and diffusing $O_3$ which is blown in by way of a quick-fit coupling arranged beside the quick-fit couplings for the heat transfer fluid and is diffused by way of three adapted ducts that are advantageously arranged under the ceiling-mounted heat accumulator. The sanitization occurs during loading from empty and for the entire duration of the loading, so as to preventively abate any and all bacterial residue and, after introduction of the products, it is repeated during the "pull down" operation to bring the products to the optimal temperature for transport.

The apparatus 1 can further comprise a system for modifying the internal atmosphere, by way of which an air exchange is not required and the metabolism of the preserved products and the corresponding emission of ethylene is significantly reduced, leading to the formation of a natural modified atmosphere that contributes to the optimal preservation of the products. The blowing-in system makes it possible from the beginning to form such modified atmosphere, further improving the quality of preservation of the products. The blowing-in occurs during the "pull down" operation of the products and is conducted by the thermal charger by way of a quick-fit coupling that is arranged beside the quick-fit couplings of the heat transfer fluid, and is advantageously distributed by way of three ducts that are arranged under the ceiling-mounted heat accumulator.

Figure 11:
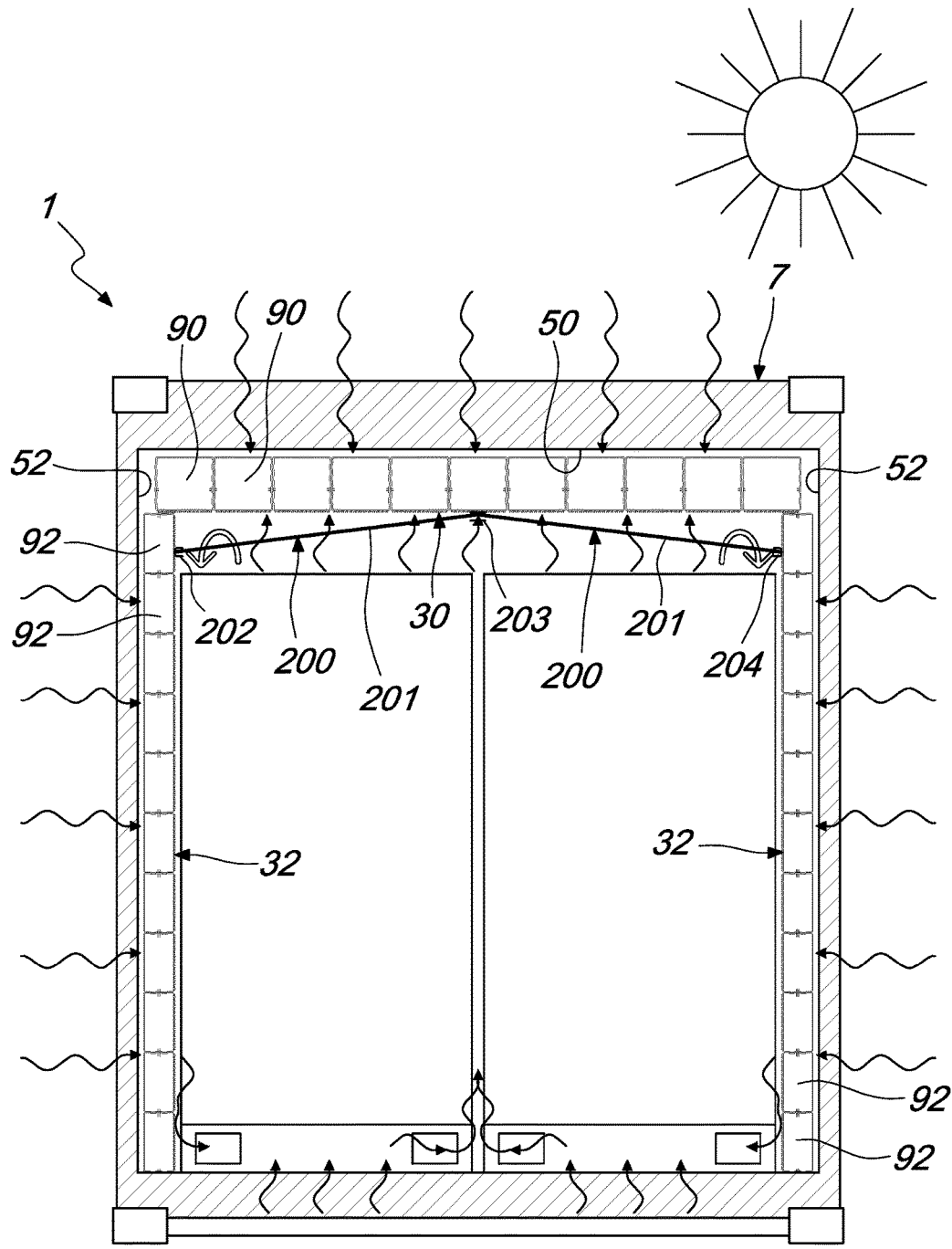
FIG. 11 is a schematic front elevation view of a fourth variation of the apparatus in FIG. 1, according to the disclosure, installed in a container, in which there is a movable anti-dripping and anti-irradiation protection.

FIG. 11 shows a further variation of the apparatus 1. According to such variation, the apparatus 1 comprises an anti-dripping and anti-irradiation protection 200. Such protection 200 advantageously comprises two roll-up awnings 201, which preferably can be accommodated in an adapted space defined in the insulation of the back wall 54. The roll-up awnings 201 are preferably made of a transpiring material, which has a microperforation that is adapted to allow the passage of air, but not of water.

Advantageously, the protection 200 comprises three longitudinal guides 202, 203, 204, which slideably support the awnings 201. The central guide 203 is arranged at the ceiling-mounted heat accumulator 30, while the two lateral guides 202 and 203 are arranged at the wall-mounted heat accumulators 32. Advantageously, the central guide 203 is arranged higher than the two lateral guides 202 and 204, so that the awnings 201 are inclined with respect to the horizontal plane of the container 7. Such inclination enables the condensed water to descend toward the lateral heat accumulators 32, without wetting the products that are present in the compartment 17. Advantageously, each awning 201 is adapted to roll up, by way of a spring-driven system, on a roller that is arranged in a recess defined in the insulation of the back wall 54 of the container 7.

The protection 200 therefore has an anti-dripping function, for the condensation that forms on the ceiling, which is particularly advantageous for the products that are sensitive to water.

The protection 200 furthermore has an anti-irradiation function for products that require preservation temperatures that are higher than the temperatures that can be maintained using exchange by natural convection and direct irradiation with the ceiling-mounted heat accumulator 30. The interposition of a thermal barrier makes it possible to use the metabolic heat of fruit and vegetable products in order to raise the ambient temperature to the levels required by products that are susceptible of damage from cold.

In particular, the presence of the aforementioned protection 200 makes it possible to also transport tropical products, such as bananas, papaya, and mango.

In practice it has been found that the apparatus for preserving and transporting fresh or frozen products, particularly for thermally insulated containers or the like, according to the present disclosure, achieves the intended aim and objects in that it makes it possible to optimize the conditions for preserving and transporting products in thermally insulated containers.

Other advantages of the apparatus 1, according to the disclosure, include:

constituting a thermal filter distributed on the walls and corner edges of the container;
evening out the temperature inside the compartment of the container, along the entire length thereof, without using forced means of ventilation;
generating natural convective motion that is capable of preventing the formation of hot spots;
having an overall exchange surface that is such as to enable the absorption of the overall heat by natural convection with a temperature delta of less than 3° C.;
controlling the internal temperature by way of the interaction between the phase transition temperature of the heat accumulation liquid, the outer exchange surface of the heat accumulators, the inner exchange surface of the heat accumulators, and the arrangement thereof inside the container;
keeping the relative humidity to values of over 90% without the assistance of humidifiers or the introduction of external air.

The apparatus for preserving and transporting fresh or frozen products, particularly for thermally insulated containers or the like thus conceived, is susceptible of numerous modifications and variations all of which are within the scope of the appended claims.

Moreover, all the details may be substituted by other, technically equivalent elements.

In practice the materials employed, provided they are compatible with the specific use, and the contingent dimensions and shapes, may be any according to requirements.

The content of Italian patent application no. MI2013A000796, the priority of which is claimed in the present application, is incorporated as a reference.

The invention claimed is:

1. An apparatus for preserving and transporting fresh or frozen products, comprising at least one heat accumulator associated with a respective inner wall of a container, and comprising a plurality of longitudinally extended heat accumulation modules, each one of said modules comprising an enclosure that delimits a cavity adapted to contain a heat accumulation liquid, said cavity accommodating a heat exchanger that can be supplied with a heat transfer fluid, wherein said heat accumulation modules are mutually connected mechanically and thermally, and said enclosure has a first wall that faces said inner wall of said container and has a flat surface and a second wall that is opposite with respect to said first wall, is directed toward the internal compartment of said container, and has an at least partially ribbed surface, and further comprising a heat accumulator associated with a ceiling of said internal compartment, and two heat accumulators associated respectively with lateral walls of said internal compartment, said ceiling-mounted heat accumulator resting on said two wall-mounted heat accumulators and being connected mechanically and thermally to each one of said two wall-mounted heat accumulators by way of the interposition of plates that are welded to said heat accumulator that is associated with the ceiling of the internal compartment and respectively to each one of said two wall-mounted heat accumulators, said apparatus constituting a monolithic structure that cooperates structurally with the structure of said container.

2. The apparatus for preserving and transporting fresh or frozen products according to claim 1, wherein said heat exchanger comprises two ducts that are ribbed internally and externally, are extended longitudinally within said enclosure and are connected, proximate to a back end of said enclosure, by a curved connector, the head end of said enclosure comprising hydraulic connectors to said two ducts.

3. The apparatus for preserving and transporting fresh or frozen products according to claim 2, wherein said enclosure comprises, on said back end, a hole with a venting valve for release of oxygen released by said heat accumulation liquid.

4. The apparatus for preserving and transporting fresh or frozen products according to claim 2, wherein said enclosure comprises, on said head end, a hole with a screw stopper for filling with said heat accumulation liquid.

5. The apparatus for preserving and transporting fresh or frozen products according to claim 1, wherein each heat accumulator covers substantially all the surface of the inner wall of said container with which it is associated, providing a thermal filter distributed on said internal wall.

6. The apparatus for preserving and transporting fresh or frozen products according to claim 1, wherein said heat accumulator is associated with the respective inner wall so that the longitudinal direction of extension of said heat accumulation modules of said heat accumulator is horizontal.

7. The apparatus for preserving and transporting fresh or frozen products according to claim 1, wherein said two wall-mounted heat accumulators are associated with the respective inner wall so that the longitudinal direction of extension of said heat accumulation modules of said heat accumulator is vertical.

8. The apparatus for preserving and transporting fresh or frozen products, according to claim 1, wherein said enclosure contains a filling material that is adapted to absorb the dilation of said heat accumulation liquid in the phase transition from liquid to solid.

9. The apparatus for preserving and transporting fresh or frozen products according to claim 1, wherein a layer of reflective material is interposed between said first wall that faces said inner wall of said container and said inner face.

10. The apparatus for preserving and transporting fresh or frozen products according to claim 1, wherein a first layer of thermally insulating material, said layer of reflective material, and a second layer of thermally insulating material are interposed respectively between said first wall that faces said inner wall of said container and said inner wall.

11. The apparatus for preserving and transporting fresh or frozen products according to claim 1, wherein each one of said modules of one of the heat accumulators is connected in parallel to other modules of the same heat accumulator by means of a delivery manifold that is sized internally so as to pre-equalize the flow-rate of said heat transfer fluid in each one of said heat exchangers and by means of a return manifold that is sized internally so as to post-equalize the flow-rate of said heat transfer fluid in each one of said heat exchangers, the input and output direction of said heat transfer fluid respectively from said delivery manifold and from said return manifold being crossed in order to obtain uniform losses of charge.

12. The apparatus for preserving and transporting fresh or frozen products according to claim 1, wherein each heat accumulator comprises a valve for modulating the flow of said heat transfer fluid.

13. The apparatus for preserving and transporting fresh or frozen products according to claim 1, wherein each heat accumulator comprises quick-coupling connectors for connection to thermal charging devices.

14. The apparatus for preserving and transporting fresh or frozen products according to claim 1, wherein a heat exchange surface/bulk surface ratio of said at least partially ribbed surface of said second wall is comprised between 3:1 and 6:1.

15. The apparatus for preserving and transporting fresh or frozen products according to claim 1, wherein said heat accumulation liquid is selected from the group consisting of:
   hydrogen peroxide at concentrations comprised between 25% and 35%;
   hydrogen peroxide at concentrations comprised between 1.5% and 5%; and
   n-decane.

16. The apparatus for preserving and transporting fresh or frozen products, according to claim 8, wherein said filling material is of closed-cell expanded polyethylene, said curved connector being embedded in said filling material.

* * * * *